US010860789B2

(12) United States Patent
Kadgi et al.

(10) Patent No.: US 10,860,789 B2
(45) Date of Patent: Dec. 8, 2020

(54) MANAGEMENT OF MULTIPLE INTERFACE PORTS

(71) Applicant: Intel Corporation, Santa Clara, CA (US)

(72) Inventors: Vijaykumar B. Kadgi, Portland, OR (US); Venkataramani Gopalakrishnan, Folsom, CA (US); Basavaraj B. Astekar, Hillsboro, OR (US); Chia-Hung S. Kuo, Folsom, CA (US); Nivedita Aggarwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 496 days.

(21) Appl. No.: 15/632,212

(22) Filed: Jun. 23, 2017

(65) Prior Publication Data
US 2018/0225272 A1 Aug. 9, 2018

Related U.S. Application Data

(60) Provisional application No. 62/456,523, filed on Feb. 8, 2017.

(51) Int. Cl.
*G06F 13/36* (2006.01)
*G06F 40/174* (2020.01)
*G06F 9/451* (2018.01)
*G06F 16/95* (2019.01)
*G06F 9/4401* (2018.01)

(52) U.S. Cl.
CPC .......... *G06F 40/174* (2020.01); *G06F 9/4403* (2013.01); *G06F 9/451* (2018.02); *G06F 16/95* (2019.01)

(58) Field of Classification Search
None
See application file for complete search history.

(56) References Cited

U.S. PATENT DOCUMENTS

| 5,299,322 A * | 3/1994 | Arai | G06F 9/4411 710/9 |
| 6,657,548 B2 * | 12/2003 | Dai | G06F 11/326 340/815.45 |
| 6,807,504 B2 * | 10/2004 | Chen | G06F 11/2221 326/30 |

(Continued)

*Primary Examiner* — Cheng Yuan Tseng
(74) *Attorney, Agent, or Firm* — Schwabe, Williamson & Wyatt, P.C.

(57) ABSTRACT

Embodiments may include systems and methods for managing multiple ports of a computing interface. A computing device may include a connector with a power port and a data port. A connector manager may identify whether a port partner is coupled to the connector, identify an inquiry related to a status of the connector, where the inquiry may be received from a BIOS of the computing device. In addition, the connector manager may generate an indication of the status of the connector, and further transmit the indication of the status of the connector to the BIOS. A BIOS may identify that a data device coupled to the connector through a port partner is to be initialized, and further transmit to a connector manager an inquiry related to a status of the connector, before initializing the data device. Other embodiments may be described and/or claimed.

22 Claims, 10 Drawing Sheets

(56) References Cited

U.S. PATENT DOCUMENTS

| | | | | |
|---|---|---|---|---|
| 7,287,199 | B2* | 10/2007 | Chang | G01R 31/31727 714/51 |
| 7,574,593 | B2* | 8/2009 | Mayfield | G06F 9/4403 713/1 |
| 7,584,347 | B2* | 9/2009 | El-Haj-mahmoud | G06F 9/4408 713/1 |
| 8,015,449 | B2* | 9/2011 | Sun | G06F 11/1417 713/2 |
| 8,365,000 | B2* | 1/2013 | Lee | G06F 1/3203 713/324 |
| 8,661,237 | B2* | 2/2014 | Chou | G06F 9/4406 709/217 |
| 8,954,629 | B2* | 2/2015 | Chuang | G06F 13/385 710/17 |
| 9,389,875 | B2* | 7/2016 | Thai | G06F 9/463 |
| 9,552,267 | B2* | 1/2017 | Sim | G06F 11/2284 |
| 10,083,101 | B2* | 9/2018 | Chu | G06F 11/328 |
| 10,417,006 | B2* | 9/2019 | Christopher | G06F 9/4401 |
| 2008/0270780 | A1* | 10/2008 | Lopez | G06F 13/385 713/1 |
| 2010/0306357 | A1* | 12/2010 | Chen | H04L 43/00 709/223 |
| 2016/0306634 | A1* | 10/2016 | Zou | G06F 9/4403 |
| 2018/0285229 | A1* | 10/2018 | Truong | G06F 13/102 |

* cited by examiner

MANAGEMENT OF MULTIPLE INTERFACE PORTS

The present application claims priority from U.S. Provisional Patent Application No. 62/456,523, filed Feb. 8, 2017, and entitled "DISPLAYPORT LATENCY SOLUTION FOR UNIVERSAL SERIAL BUS TYPE-C (USB-C) CONNECTORS," the entire disclosure of which is hereby incorporated by reference.

FIELD

Embodiments of the present invention relate generally to the technical field of communication and computing, and more particularly to computing interface, and management of multiple ports of a computing interface.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A connector of a computing device, e.g., a Universal Serial Bus Type-C (USB-C) connector, may be an interface device to couple the computing device to another device. A connector may include various ports, e.g., a data port, or a power port, for data communication or power supply, between a computing device and other devices and components. A data port may be any socket used for data communications. A data port may be used to couple a monitor, a webcam, speakers, other peripheral devices, or any other data devices, while a power port may be used to establish a power connection between two devices. A connector with multiple ports, e.g., a data port and a power port, may operate in different modes in various configurations, and perform different operations related to the data port and the power port.

Multiple devices or components, such as various buses, storage devices, displays, other input/output devices, etc., may be coupled to the computing device through a connector. When a computing device is coupled to another device through a connector, a basic input/output system (BIOS) of the computing device may manage certain functions of another device. When a connector has multiple ports or operates in different modes and configurations, there may be additional challenges to the BIOS of the computing device in managing another device coupled to the computing device through the connector. For example, a USB-C connector may support various modes, such as Thunderbolt Alternate mode and Display Port (DP) Alternate mode, and operate in different configurations. When a computing device is coupled to a display device through a USB-C connector with a power port and a data port, the initiation of the display device may be difficult to control by a BIOS of the computing device, since establishing a connection through the power port of the USB-C connector and configuring the data port of the USB-C connector may have different time durations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
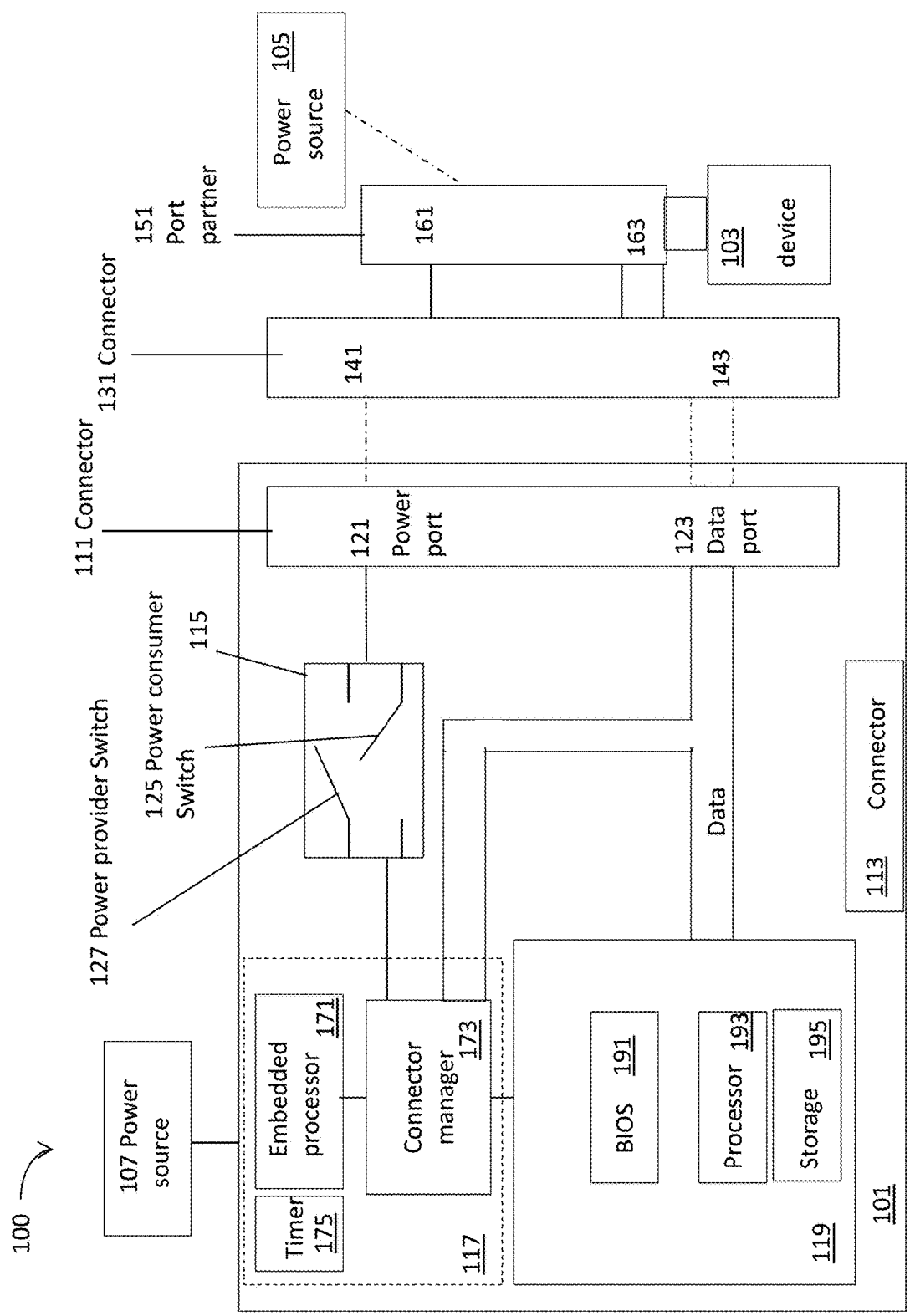
FIG. 1 illustrates an example computing system including a computing device coupled to another device through a connector with a power port and a data port, in accordance with various embodiments.

Managing a connector with multiple ports that may operate in different modes and configurations can be challenging. For example, when a computing device is coupled to a display device through a USB-C connector with a power port and a data port, the initiation of the display device may be difficult to control by a basic input/output system (BIOS) of the computing device. Legacy solutions may add a fixed amount of latency in a boot process managed by the BIOS regardless whether any device is coupled to the USB-C connector. The added fixed amount of latency may be long and undesirable in some cases.

Embodiments herein may support the use of a display device coupled to a USB-C connector in any operation mode and configuration the USB-C connector may be in. A connector manager may execute a protocol independent of the BIOS to understand the nature of a USB-C port partner coupled to the USB-C connector, and provide feedback to the BIOS to manage the initiation of the display device coupled to the USB-C port partner. Embodiments herein may be applied to cases when the BIOS may intend to have the display device operational during the boot process.

In embodiments, a computing device may include a connector with a power port and a data port. A connector manager may be coupled to the connector to manage the operations of the connector. In detail, the connector manager may identify whether a port partner is coupled to the connector, and identify an inquiry related to a status of the connector, where the inquiry may be received from a BIOS of the computing device. In addition, the connector manager may generate, based on the identification of whether the port partner is coupled to the connector and the inquiry, an indication of the status of the connector, and further transmit the indication of the status of the connector to the BIOS.

In embodiments, a computing device may include a connector with a power port and a data port. A processor may be coupled to the connector, where a BIOS may be executed by the processor. The BIOS may identify that a data device coupled to the connector through a port partner is to be initialized. The BIOS may further transmit to a connector manager an inquiry related to a status of the connector, before initializing the data device.

In embodiments, a computing system may include a connector with a power port and a data port. An embedded processor may be coupled to the connector. The embedded processor may identify a port partner is coupled to the connector, and establish a connection through the power port of the connector with the port partner when the port partner has a capability for power delivery through the power port of the connector. Furthermore, the embedded processor may configure the data port of the connector when the port partner has a capability for data communication through the data port of the connector. In addition, the embedded processor may identify an inquiry related to a status of the connector, where the inquiry may be received from a BIOS of the computing system. Afterwards, the embedded processor may generate, based on the identification of the port partner coupled to the connector and the inquiry, an indication of the status of the connector, and transmit the indication of the status of the connector to the BIOS.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example computing system 100 including a computing device 101 coupled to another device, e.g., a device 103, through a connector 111 with a power port 121 and a data port 123, in accordance with various embodiments. For clarity, features of the computing system 100 are described below as an example of a computing system that may include a computing device coupled to another device through a connector with a power port and a data port. It is to be understood that there may be more or fewer components included in the computing system 100. Further, it is to be understood that one or more of the devices and components within the computing system 100 may include additional and/or varying features from the description below, and may include any device that one having ordinary skill in the art would consider and/or refer to as a computing system.

In embodiments, the computing device 101 may include the connector 111, an optional second connector, e.g., a connector 113, a switch 115, an embedded system 117, and a main system 119. The connector 111 may include the power port 121 and the data port 123. The switch 115 may include a power consumer switch 125 and a power provider switch 127. The main system 119 may include a BIOS 191, a processor 193, and a storage 195. The embedded system 117 may include an embedded processor 171, a connector manager 173, and a timer 175. The connector 111 may be coupled to a connector 131 with a power port 141 and a data port 143. A port partner 151 may be coupled to the connector 131, and may include a power port 161 and a data port 163. The device 103 may be coupled to the data port 163 of the port partner 151, while a power source 105 may be coupled to the port partner 151 through the power port 161. In addition, a power source 107 may be coupled to the computing device 101.

In embodiments, the BIOS 191, the processor 193, the storage 195, the embedded processor 171, the timer 175, the switch 115, the power source 105, or the power source 107, may be any BIOS, processor, storage device, timer, switch, or power source that one having ordinary skill in the art would consider and/or refer to as a BIOS, a processor, a storage device, a timer, a switch, or a power source. More details of such examples may be found in FIG. 2 and FIG. 7.

In embodiments, the computing system 100 may be a desktop system, where the device 103 may be an external display device coupled to the computing device 101 through the connector 111. In some other embodiments, the computing system 100 may be a mobile system, where the device 103 may be an internal display device coupled to the computing device 101 through the connector 111. In some embodiments, the computing system 100 may have only one power source. For example, the computing system 100 may not have the power source 105 or the power source 107. In some embodiments, there may be only one connector, e.g., the connector 111, included in the computing device 101, while the connector 113 may not present. When the connector 113 is included in the computing device 101, there may be an additional device coupled to the connector 113, not shown.

Figure 3:
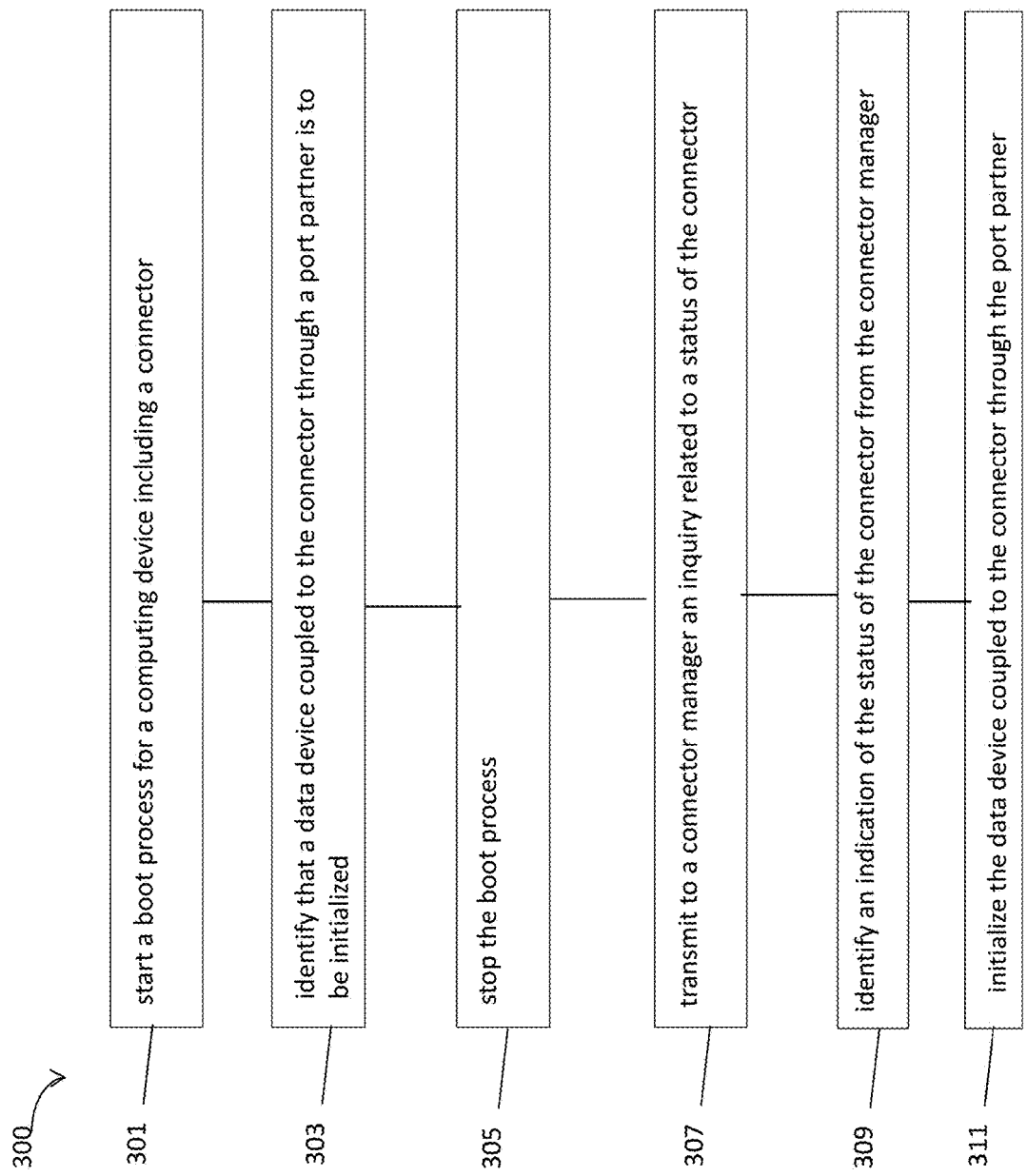
FIG. 3 illustrates an example process for a basic input/output system (BIOS) of a computing device managing certain functions of another device coupled to the computing device through a connector with a power port and a data port, in accordance with various embodiments.

In embodiments, the BIOS 191 may be executed by the processor 193, performing operations illustrated in FIG. 3, to manage a boot process for the computing device 101, and the initiation of the device 103. In addition, the connector manager 173 may be executed by the embedded processor 171, performing operations illustrated in FIG. 4, to identify whether a port partner 151 is coupled to the connector 111, and to manage the connections of the port partner 151 and the connector 111. The additional use of the connector manager 173 to manage the connection of the port partner 151 and the connector 111 may provide the flexibility for the BIOS 191 to adjust the boot process according to the status of the connector 111. For example, the BIOS 191 would wait to perform the initiation of the device 103 coupled to the connector 111 through the port partner 151 until a power connection or a data port configuration between the connector 111 and the port partner 151 have been established or performed.

In embodiments, the connector manager 173 may control the power consumer switch 125 or the power provider switch 127 within the switch 115 so that the computing device 101 may provide power through the power port 121 of the connector 111, or consume power through the power port 121 of the connector 111. When the computing device 101 may provide power to the device 103, the computing device 101 may be a downstream facing port (DFP) system. On the other hand, when the computing device 101 may consume power provided by the power source 105, the computing device 101 may be an upstream facing port (UFP) system.

In embodiments, the connector 111 may be any connector including the power port 121 and the data port 123. The connector 111 may be of various shapes, diameters, with different number of pins, sockets, and operating in different voltages and currents. For example, the connector 111 may be a USB-C connector, any other USB connector for a host and a peripheral, an Advanced Technology Attachment (ATA) connector, a Serial ATA (SATA) connector, a Parallel ATA (PATA) connector, a backplane connector, a battery connector, a board-to-board connector, or a printed circuit board (PCB) connector. The data port 123 may be any data port, such as a Display Port (DP), a High-Definition Multimedia Interface (HDMI) port, a Digital Visual Interface (DVI) port, a Digital Visual Interface (DVI) port, or a Video Graphics Array (VGA) port. The connector 111 may support multiple modes of operations. For example, when the connector 111 is a USB-C connector, the connector 111 may support a Thunderbolt Alternate mode and a DP Alternate mode of operations.

In embodiments, the port partner 151 may be an adaptor without a power port, a port partner of a docking station with a power port, or a port partner of a docking station without a power port. In more detail, the port partner 151 may be a docking station including a DP capable sink and power provider. Additionally and alternatively, the port partner 151 may be a self-powered multi-function docking station (MFD). Furthermore, the port partner 151 may be a dual-role port (DRP) docking station to provide power or consume power, so that the computing device 101 may be a UFP system or a DFP system. In some embodiments, the port partner 151 may have the power port 161 and have a capability for power delivery through the power port 121 of the connector 111. In some other embodiments, the port partner 151 may have the data port 163 and have a capability for data communication through the data port 123 of the connector 111. For example, the port partner 151 may be a DP dongle, which may be unpowered without the power source 105. In some embodiments, the port partner 151 may not be present, and the device 103 may be a simple USB device (like keyboard/mouse) inserted in the connector 111, which may be a USB-C connector.

Figure 2:
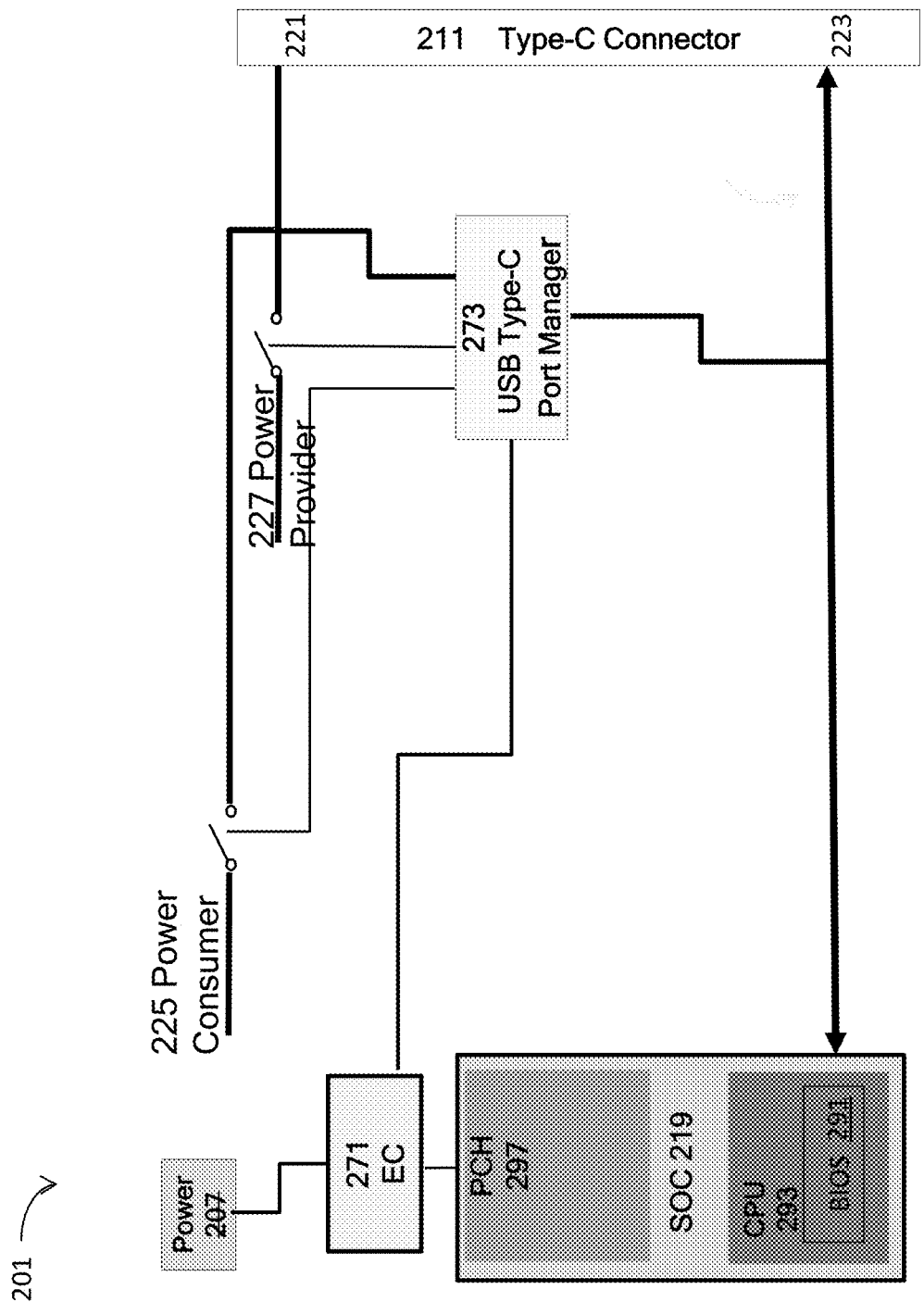
FIG. 2 illustrates an example computing device including a connector with a power port and a data port, in accordance with various embodiments.

FIG. 2 illustrates an example computing device 201 including a connector 211 with a power port 221 and a data port 223, in accordance with various embodiments. In embodiments, the computing device 201 may be similar to the computing device 101 shown in FIG. 1. The detailed description for each part of the computing device 201 may be similar to the description of a similar part for the computing device 101.

In embodiments, the connector 211 may be a USB-C connector with the power port 221 and the data port 223. The computing device 201 may include a main system 219, which may be a system on chip (SoC). For example, the main system 219 may include a processor 293, and a platform controller hub (PCH) 297 that may manage different circuits and processors within the main system 219. A BIOS 291 may be executed by the processor 293. The computing device 201 may also include an embedded processor 271, and a connector manager 273, which may be referred to as a port manager. The connector manager 273 may be implemented as a circuit separated from the embedded processor 271. Additionally and alternatively, the connector manager 273 may be implemented as software being executed by the embedded processor 271. In addition, the computing device 201 may include a power consumer switch 225 and a power provider switch 227, which may be controlled by the connector manager 273. Furthermore, the computing device 201 may be coupled to a power source 207.

In embodiments, the connector 211, the BIOS 291, the processor 293, the embedded processor 271, the connector manager 273, the power consumer switch 225, and the power provider switch 227, may be similar to the connector 111, the BIOS 191, the processor 193, the embedded processor 171, the connector manager 173, the power consumer switch 125, and the power provider switch 127, as shown in FIG. 1. In embodiments, the BIOS 291 may be executed by the processor 293, performing operations illustrated in FIG. 3, to manage a boot process for the computing device 201. In addition, the connector manager 273 may be executed by the embedded processor 271, performing operations illustrated in FIG. 4, to identify whether a port partner is coupled to the connector 211, and to manage the connection of the port partner and the connector 211.

FIG. 3 illustrates an example process 300 for a BIOS of a computing device managing certain functions of another device coupled to the computing device through a connector with a power port and a data port, in accordance with various embodiments. In embodiments, the process 300 may be a process performed by the BIOS 191 of the computing device 101 to manage a boot process for the computing device 101, and the initiation of the device 103 coupled to the computing device 101 through the connector 111 with the power port 121 and the data port 123.

In embodiments, operation 301 may be performed to start a boot process for a computing device including a connector. For example, operation 301 may be performed to start a boot process for the computing device 101. In detail, operation 301 may be performed to run a power-on self test (POST) of the computing device 101, in a predetermined memory address, and may further initialize the processor 193, perform memory reference code (MRC) initialization, and check the inventoried hardware devices, such as the video card, the connector 111, and secondary storage devices.

In embodiments, operation 303 may be performed to identify that a data device coupled to the connector through a port partner is to be initialized. For example, operation 303 may be performed to identify that the device 103 coupled to the connector 111 through the port partner 151 is to be initialized.

In embodiments, operation 305 may be performed to stop the boot process, and next, operation 307 may be performed to transmit to a connector manager an inquiry related to a status of the connector. For example, operation 305 may be performed to stop the boot process after identifying that the device 103 coupled to the connector 111 through the port partner 151 is to be initialized. Afterward, operation 307 may be performed to transmit to the connector manager 173 an inquiry related to a status of the connector 111. After the inquiry related to a status of the connector 111 has been transmitted, the BIOS 191 may wait to receive an indication of the status of the connector 111. In embodiments, while waiting for the indication of the status of the connector 111, the BIOS 191 may perform other operations that do not involve the device 103 coupled to the connector 111 through the port partner 151.

In embodiments, operation 309 may be performed to identify an indication of the status of the connector from the connector manager, and operation 311 may be performed to initialize the data device coupled to the connector through the port partner. For example, operation 309 may be performed to identify an indication of the status of the connector 111 from the connector manager 173. Based on the indication of the status of the connector 111, operation 311 may be performed to initialize the device 103 coupled to the connector 111 through the port partner 151. In this way, the BIOS 191 may not attempt to initialize the device 103 before the connector 111 and the port partner 151 are ready for operation. Due to the various configurations and operation modes the connector 111 and the port partner 151 may be in, it may be hard to predict exactly how much time it may use to configure the data port 123 of the connector 111 or to establish a power connection through the power port 121 of the connector 111. The BIOS 191 may simply wait for the indication of the status of the connector 111 from the connector manager 173, so that the BIOS 191 may initialize the device 103 when the data port 123 of the connector 111 is configured or a power connection through the power port 121 of the connector 111 is established.

Figure 4:
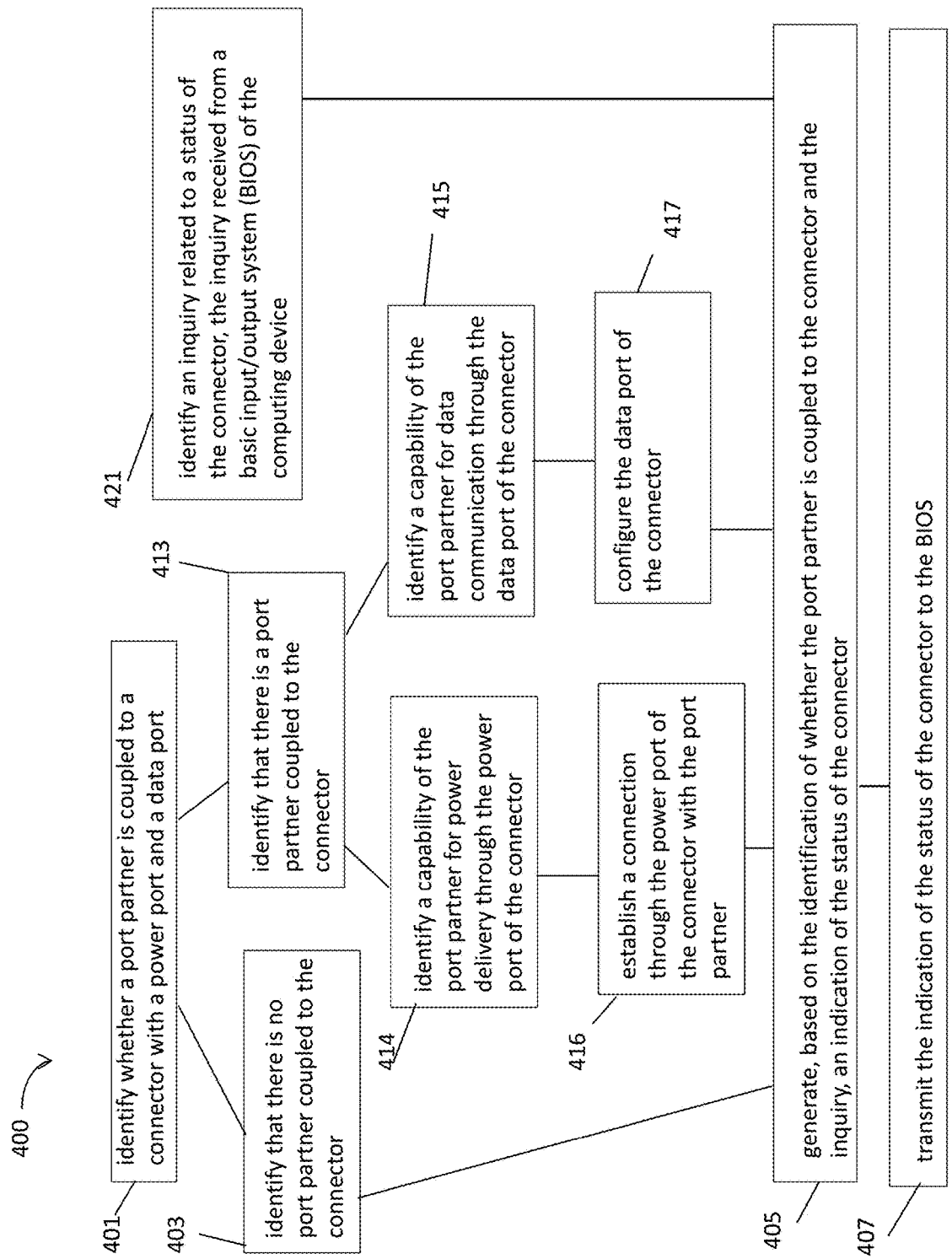
FIG. 4 illustrates an example process for a connector manager managing a connector with a power port and a data port, in accordance with various embodiments.

FIG. 4 illustrates an example process 400 for a connector manager managing a connector with a power port and a data port, in accordance with various embodiments. In embodiments, the process 400 may be a process for the connector manager 173 managing the connector 111 with the power port 121 and the data port 123.

In embodiments, operation 401 may be performed to identify whether a port partner is coupled to a connector with a power port and a data port. For example, operation 401 may be performed to identify whether a port partner, e.g., the port partner 151, is coupled to the connector 111 with the power port 121 and the data port 123. In embodiments, operation 401 may be performed by the connector manager 173 even before the BIOS 191 starts a boot process, or at a time independent from the time the BIOS 191 starts a boot process. If there is a port partner identified in operation 401, the connector manager 173 may perform appropriate operations such as power delivery negotiation, device identity discovery, and other operations related to the power port and the data port of the connector. When there are multiple connectors on the computing device, operation 401 may be performed for each connector. For example, the connector manager 173 may look at all the connectors to identify whether a port partner is coupled to a connector with a power port and a data port.

In embodiments, operation 421 may be performed to identify an inquiry related to a status of the connector, the inquiry received from a BIOS of the computing device. For example, operation 421 may be performed to identify an inquiry related to a status of the connector 111, where the inquiry may be received from the BIOS 191. In embodiments, the inquiry may be an example of the inquiry transmitted at operation 307 by the BIOS 191, as shown in FIG. 3.

In embodiments, operation 403 may be performed to identify that there is no port partner coupled to the connector. In such a case, operation 405 may be performed to generate, based on the identification of whether the port partner is coupled to the connector and the inquiry, an indication of the status of the connector. Furthermore, operation 407 may be performed to transmit the indication of the status of the connector to the BIOS. For example, based on the identification that there is no port partner coupled to the connector, operation 405 may be performed to generate an indication of approval, e.g., an OK message, and operation 407 may be performed to transmit the indication of the status of the connector, e.g., the OK message, to the BIOS 191. After receiving such an indication of approval, the BIOS 191 may continue the execution of the boot process without much latency impact in this case.

Alternatively, in embodiments, operation 413 may be performed to identify that there is a port partner coupled to the connector. For example, operation 413 may be performed to identify that the port partner 151 is coupled to the connector 111 with the power port 121 and the data port 123. When the port partner 151 coupled to the connector 111 is identified, the connector manager 173 may not transmit an indication of the status of the connector 111 until operations in establishing power connection through the power port 121 or configuring the data port 123 have been performed.

In embodiments, operation 414 may be performed to identify a capability of the port partner for power delivery through the power port of the connector. Afterwards, operation 416 may be performed to establish a connection through the power port of the connector with the port partner. For example, operation 414 may be performed to identify a capability of the port partner 151 for power delivery through the power port 121 of the connector 111, and operation 416 may be performed to establish a connection through the power port 121 of the connector 111 with the port partner 151. In embodiments, in order to identify the capability of the port partner 151 for power delivery through the power port 121 of the connector 111, the connector manager 173 may start a timer for the connector 111, and identify the capability of the port partner 151 for power delivery when the connector manager 173 receives, before the timer expires, a response or a command from the port partner 151 coupled to the connector 111.

As an example, when the computing device 101 is a DFP system to provide power, if the connector manager 173 does not receive a response to any power delivery message sent to the port partner 151 within a timeout period of the timer 175, the connector manager 173 may infer that the port partner 151 may not have a capability for power delivery. On the other hand, if the connector manager 173 may receive, within a timeout period of the timer 175, a response to a power delivery message sent to the port partner 151, the connector manager 173 may conclude that the port partner 151 may have a capability for power delivery.

As another example, when the computing device 101 is a UFP system to consume power, if the connector manager 173 does not receive a command on the connector 111 within a timeout period of the timer 175, the connector manager 173 may infer that the port partner 151 may not have a capability for power delivery. On the other hand, if the connector manager 173 may receive, within a timeout period of the timer 175, a command for the connector 111 from the port partner 151, the connector manager 173 may conclude that the port partner 151 may have a capability for power delivery.

In embodiments, operation 415 may be performed to identify a capability of the port partner for data communication through the data port of the connector. Afterwards, operation 417 may be performed to configure the data port of the connector. For example, operation 415 may be performed to identify a capability of the port partner 151 for data communication through the data port 123 of the connector 111, and operation 417 may be performed to configure the data port 123 of the connector 111. In embodiments, in order to identify the capability of the port partner 151 for data communication through the data port 123 of the connector 111, the connector manager 173 may start a timer for the connector 111, and identify the capability of the port partner 151 for data communication when the connector manager 173 receives, before the timer expires, a response or a command from the port partner 151 coupled to the connector 111.

As an example, when the computing device 101 is a source to provide data, if the connector manager 173 does not receive a response to a discovery message sent to the port partner 151 within a timeout period of the timer 175, the connector manager 173 may infer that the port partner 151 may not have a capability for data communication. On the other hand, if the connector manager 173 may receive, within a timeout period of the timer 175, a response to a discovery message sent to the port partner 151, the connector manager 173 may conclude that the port partner 151 may have a capability for data communication. In embodiments, the response to a discovery message sent to the port partner 151 may include an identification of the device supported by the port partner 151, e.g., an identification of the device 103 coupled to the port partner 151.

As another example, when the computing device 101 is a sink to receive data, if the connector manager 173 does not receive a command on the connector 111 within a timeout period of the timer 175, the connector manager 173 may infer that the port partner 151 may not have a capability for data communication. On the other hand, if the connector manager 173 may receive, within a timeout period of the timer 175, a command for the connector 111 from the port partner 151, the connector manager 173 may conclude that the port partner 151 may have a capability for data communication.

In embodiments, operation 414 may be performed multiple times to identify a capability of the port partner for power delivery through the power port of the connector. Similarly, operation 415 may be performed multiple times to identify a capability of the port partner for data communication through the data port of the connector. The connector manager 173 may manage how many times operation 414 or operation 415 to be performed, based on the applications of interests.

In embodiments, operation 405 may be performed to generate, based on the identification of whether the port partner is coupled to the connector and the inquiry, an indication of the status of the connector. Furthermore, operation 407 may be performed to transmit the indication of the status of the connector to the BIOS.

For example, based on the identification at operation 413 that there is a port partner coupled to the connector, and further identification at operation 414 that the port partner has a capability for power delivery through the power port of the connector, the indication of the status of the connector may be generated at operation 405 after a connection through the power port of the connector with the port partner has been established at operation 416. The indication of the status of the connector may be an indication of approval, e.g., an OK message, which may be transmitted to the BIOS 191. After receiving such an indication of approval, the BIOS 191 may continue the execution of the boot process.

Similarly, based on the identification at operation 413 that there is a port partner coupled to the connector, and further identification at operation 415 that the port partner has a capability for data communication through the data port of the connector, the indication of the status of the connector may be generated at operation 405 after the data port of the connector has been configured at operation 417. The indication of the status of the connector may be an indication of approval, e.g., an OK message, which may be transmitted to the BIOS 191. After receiving such an indication of approval, the BIOS 191 may continue the execution of the boot process without much latency impact in this case.

Figure 5:
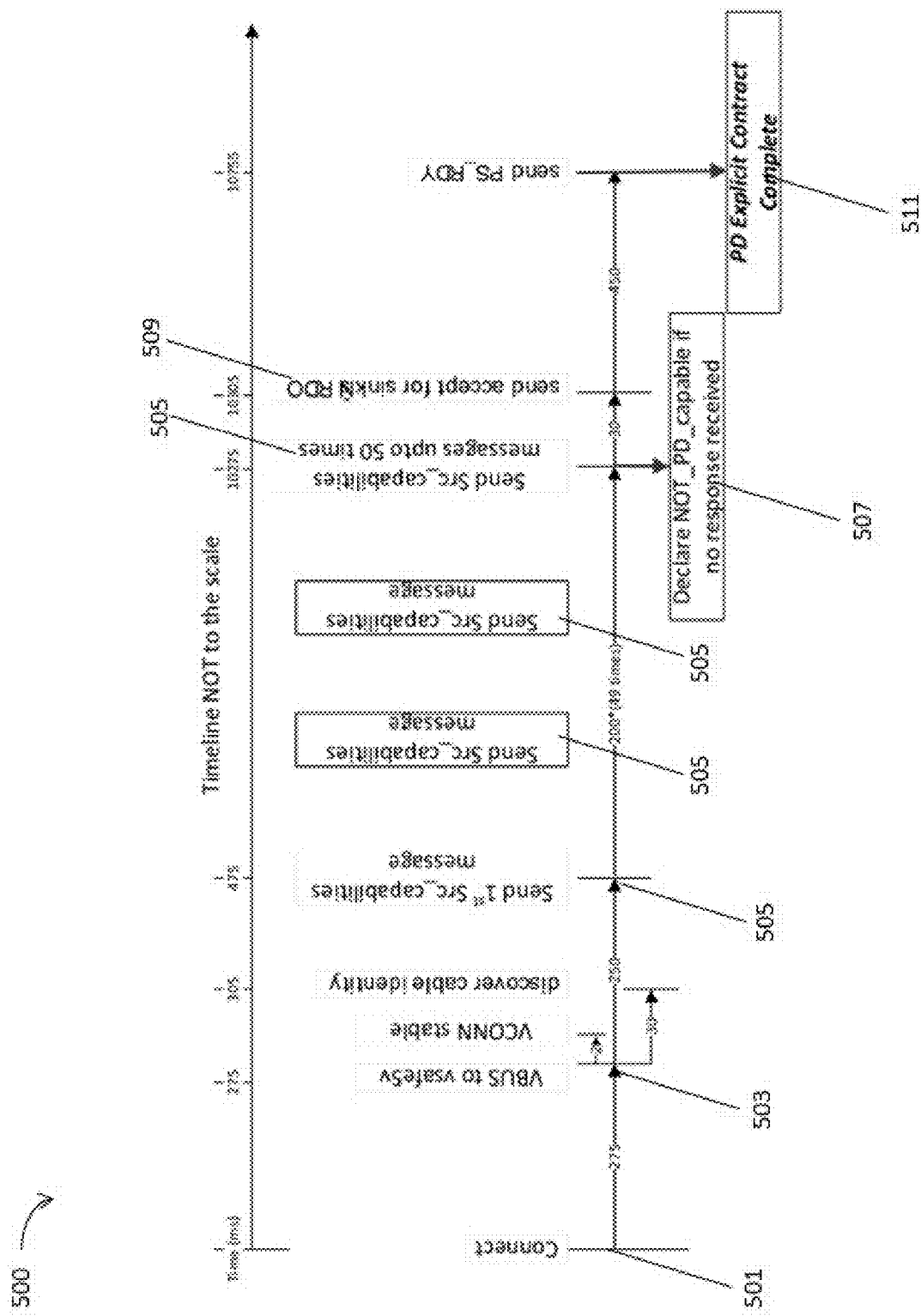
FIG. 5 illustrates an example process for a connector manager managing a power port of a connector, in accordance with various embodiments.

FIG. 5 illustrates an example process 500 for a connector manager managing a power port of a connector, in accordance with various embodiments. In embodiments, the process 500 may be performed by the connector manager 173 in managing the power port 121 of the connector 111, as shown in FIG. 1. For example, the process 500 may include some details of the operation 414 to identify a capability of the port partner 151 for power delivery through the power port 121 of the connector 111, and operations 416 to establish a connection through the power port of the connector with the port partner, as applied to the case when the computing device 101 is a DFP system to provide power. There may be other detailed actions of the operation 414 not illustrated in FIG. 5. Numeral values used in FIG. 5 are for examples purpose only, and are not limiting.

In embodiments, operation 501 may be performed to connect a port partner, e.g., the port partner 151 that is an adaptor. Within 275 milliseconds (ms) of operation 501, at operation 503, VBUS may reach a stable value 5v (Vsafe5v). Other operations, e.g., detect the voltage being stable, discover cable identify, may be performed as well. Within 250 ms of operation 503, operation 505 may be performed to start sending a message, e.g., src_capabilities, to the port partner 151, e.g., an adapter. Operation 505 may be repeated for up to 50 times total every 100-200 ms. Afterwards, operation 507 may be performed to declare that the port partner 151 may not have a capability for power delivery through the power port 121 of the connector 111, when there is no response received after repeating operation 505 multiple times, e.g., 50 times. Alternatively, a response may be received from the port partner 151 after repeating operation 505 multiple times, where the response may include a requested capability. Operation 509 may be performed to accept the requested capability for the port partner 151. Furthermore, operation 511 may be performed to send a message, e.g., PS_RDY, to indicate a successful power delivery negotiation sequence may have been completed. In embodiments, a successful power delivery negotiation sequence may include operations such as discover cable identity, send source capabilities, accept the requested capability for the port partner, and send a message, to indicate a successful power delivery negotiation sequence. In some embodiments, a successful power delivery negotiation sequence may take up to 10.755 seconds.

Figure 6:
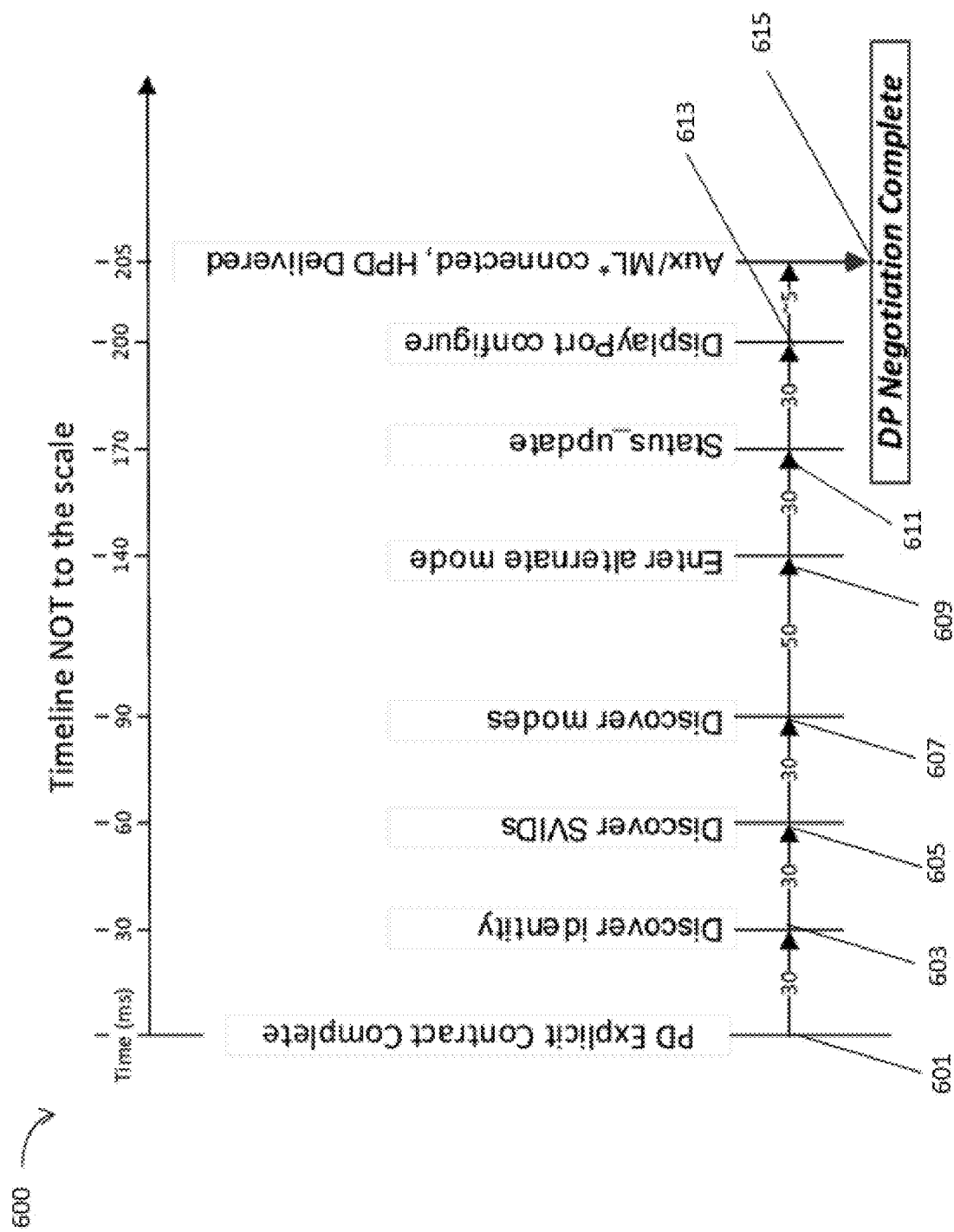
FIG. 6 illustrates an example process for a connector manager managing a data port of a connector, in accordance with various embodiments.

FIG. 6 illustrates an example process 600 for a connector manager managing a data port of a connector, in accordance with various embodiments. In embodiments, the process 600 may be performed by the connector manager 173 in managing the data port 123 of the connector 111, as shown in FIG. 1. For example, the process 600 may include some details of the operation 415 and operation 417 illustrated in FIG. 4, to identify a capability of the port partner 151 for data communication through the data port 123 of the connector 111, and to configure the data port 123. Numeral values used in FIG. 6 are for examples purpose only, and are not limiting.

In embodiments, the process 600 may be performed after the processor 500 have been performed. For example, operation 601 may indicate a successful power delivery negotiation sequence may have been performed for the port partner 151. Afterwards, a sequence of operations, e.g., operation 603, operation 605, operation 607, operation 609, and operation 611 may be detailed operations of the operation 415 to identify a capability of the port partner for data communication through the data port of the connector. In embodiments, operation 603, operation 605, operation 607, operation 609, and operation 611 may be a sequence of operations for data port alternate mode negotiation sequence for a USB-C connector. In details, operation 603 may be performed to discover identity of the port partner, operation 605 may be performed to discover SVID, operation 607 may be performed to discover modes, operation 609 may be performed to enter alternate mode, and operation 611 may be performed to update status. Operation 613 may be similar to the operation 417 to configure the data port of the connector. Furthermore, operation 615 may be a detailed operation of the operation 405 to generate an indication of the status of the connector 111. In embodiments, the sequence of operations from operation 601 to operation 615 may take up to 205 ms, where each message may take approximately 30 ms, except enter mode which may take 50 ms, and there may be a total of 6 such messages.

Figure 7:
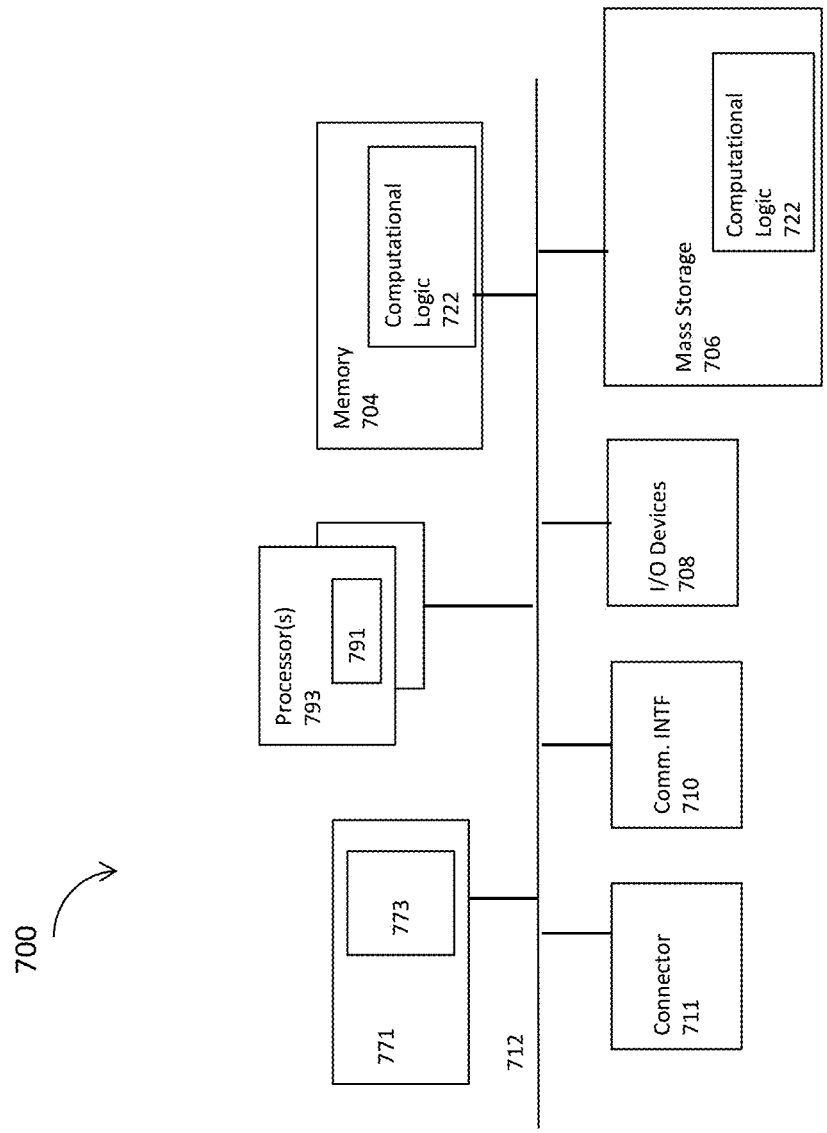
FIG. 7 illustrates an example device suitable for use to practice various aspects of the present disclosure, in accordance with various embodiments.

FIG. 7 illustrates an example computing device 700 that may include and/or be suitable for use with various components described herein. As shown, computing device 700 may include one or more processors or processor cores 793, a BIOS 791, one or more embedded processor 771, a connector manager 773, a connector 711, system memory 704, and mass storage 706. For the purpose of this application, including the claims, the terms "processor" and "processor cores" may be considered synonymous, unless the context clearly requires otherwise. In some embodiments, the processor 793, the BIOS 791, the embedded processor 771, the connector manager 773, and the connector 711 may be an example of the processor 193, the BIOS 191, the embedded processor 171, the connector manager 173, and the connector 111, as shown in FIG. 1.

The processor 793 may include any type of processors, such as a central processing unit (CPU), a microprocessor, and the like. The processor 793 may be implemented as an integrated circuit having multi-cores, e.g., a multi-core microprocessor. The computing device 700 may include mass storage devices 706 (such as diskette, hard drive, volatile memory (e.g., dynamic random-access memory (DRAM), compact disc read-only memory (CD-ROM), digital versatile disk (DVD), and so forth). In general, system memory 704 and/or mass storage devices 706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth. The processor(s) 793, mass storage 706 and/or system memory 704 may together or separately be considered to be, or implement, the BIOS 791 in whole or in part. The embedded processor 771, mass storage 706 and/or system memory 704 may together or separately be considered to be, or implement, the connector manager 773 in whole or in part.

The computing device 700 may further include I/O devices 708 (such as a display (e.g., a touchscreen display), keyboard, cursor control, remote control, gaming controller, image capture device, and so forth) and communication interfaces 710 (such as network interface cards, modems, infrared receivers, radio receivers (e.g., Bluetooth), and so forth). In some embodiments the I/O devices 708 may be coupled with the other components of the computing device 700 via the connector 711 as described herein.

The communication interfaces 710 may include communication chips (not shown) that may be configured to operate the device 700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 710 may operate in accordance with other wireless protocols in other embodiments. In some embodiments, the communication interfaces 710 may be, may include, and/or may be coupled with the EC and/or TCPM as described herein.

The above-described computing device 700 elements may be coupled to each other via system bus 712, which may represent one or more buses. In the case of multiple buses, they may be bridged by one or more bus bridges (not shown). Each of these elements may perform its conventional functions known in the art. In particular, system memory 704 and mass storage devices 706 may be employed to store a working copy and a permanent copy of the programming instructions for the operation of various components of computing device 700, including but not limited to an operating system of computing device 700 and/or one or more applications. The various elements may be implemented by assembler instructions supported by processor(s) 793 or high-level languages that may be compiled into such instructions.

The permanent copy of the programming instructions may be placed into mass storage devices 706 in the factory, or in the field through, for example, a distribution medium (not shown), such as a compact disc (CD), or through communication interface 710 (from a distribution server (not shown)). That is, one or more distribution media having an implementation of the agent program may be employed to distribute the agent and to program various computing devices.

The number, capability, and/or capacity of the elements 708, 710, 712 may vary, depending on whether computing device 700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 704 may include computational logic 722 configured to implement various firmware and/or software services associated with operations of the computing device 700. For some embodiments, at least one of processors 793 may be packaged together with computational logic 722 configured to practice aspects of embodiments described herein to form a system in package (SiP) or a SoC.

In various implementations, the computing device 700 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 700 may be any other electronic device that processes data. In some embodiments certain elements such as the BIOS, USB-C, embedded processors are described as related to specific elements of FIG. 7, while in other embodiments one or more of the various elements may be related to different elements of FIG. 7.

Figure 8:
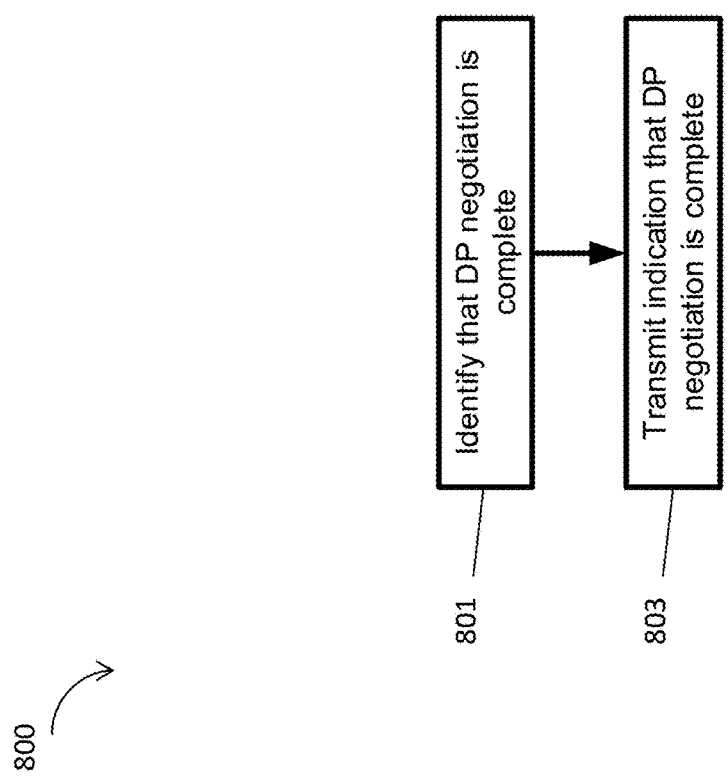
FIG. 8 illustrates another example process for a connector manager managing a data port of a connector, in accordance with various embodiments.

FIG. 8 illustrates another example process for a connector manager managing a data port of a connector, which may be performed by the device 700. For example, the process 800 may include: identifying, at operation 801, by an embedded controller (EC), that DisplayPort (DP) negotiation for a DP capable port partner is complete; and transmitting, at operation 803, by the EC to a basic input/output system (BIOS), an indication that the DP negotiation is complete. In embodiments, the process 800 may be a portion of the process 400 illustrated in FIG. 4. For example, operation 801 may be an example for a part of the operation 417, which is performed to configure the data port of the connector. Furthermore, operation 803 may be an example for a part of the operation 407, which is performed to transmit the indication of the status of the connector to the BIOS.

Figure 9:
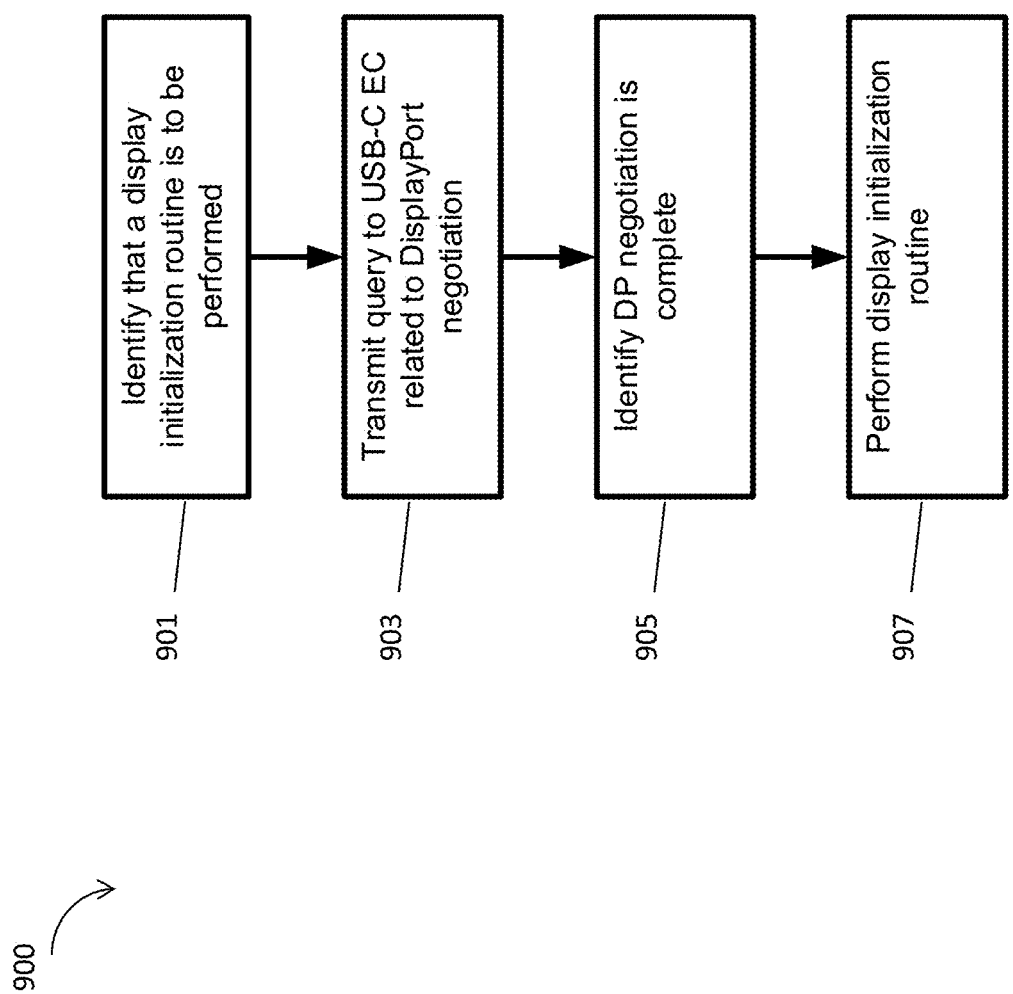
FIG. 9 illustrates another example process for a BIOS of a computing device managing certain functions of another device coupled to the computing device through a connector with a power port and a data port, in accordance with various embodiments.

FIG. 9 illustrates another example process for a BIOS of a computing device managing certain functions of another device coupled to the computing device through a connector with a power port and a data port, which may be performed by the device 700. For example, the process 900 may include identifying, at operation 901, by a BIOS, that a display initialization routine is to be performed; transmitting, at operation 903, by the BIOS based on the identification of the display initialization routine and prior to performance of the display initialization routine, a query to a USB-C embedded controller (EC) related to DisplayPort negotiation; identifying, at operation 905, by the BIOS based on the query, an indication received from the USB-C EC that the DP negotiation is complete; and performing, at operation 907, by the BIOS based on the indication, the display initialization routine. In embodiments, the process 900 may be a portion of the process 300 illustrated in FIG. 3. For example, operation 901 may be an example for a part of the operation 303, which is performed to identify that a data device coupled to the connector through a port partner is to be initialized. Furthermore, operation 903 may be an example for a part of the operation 307, which is performed to transmit to a connector manager an inquiry related to a status of the connector. In addition, operation 905 may be an example for a part of the operation 309, which is performed to identify an indication of the status of the connector from the connector manager. Finally, operation 907 may be an example for a part of the operation 311, which is performed to initialize the data device coupled to the connector through the port partner.

Figure 10:
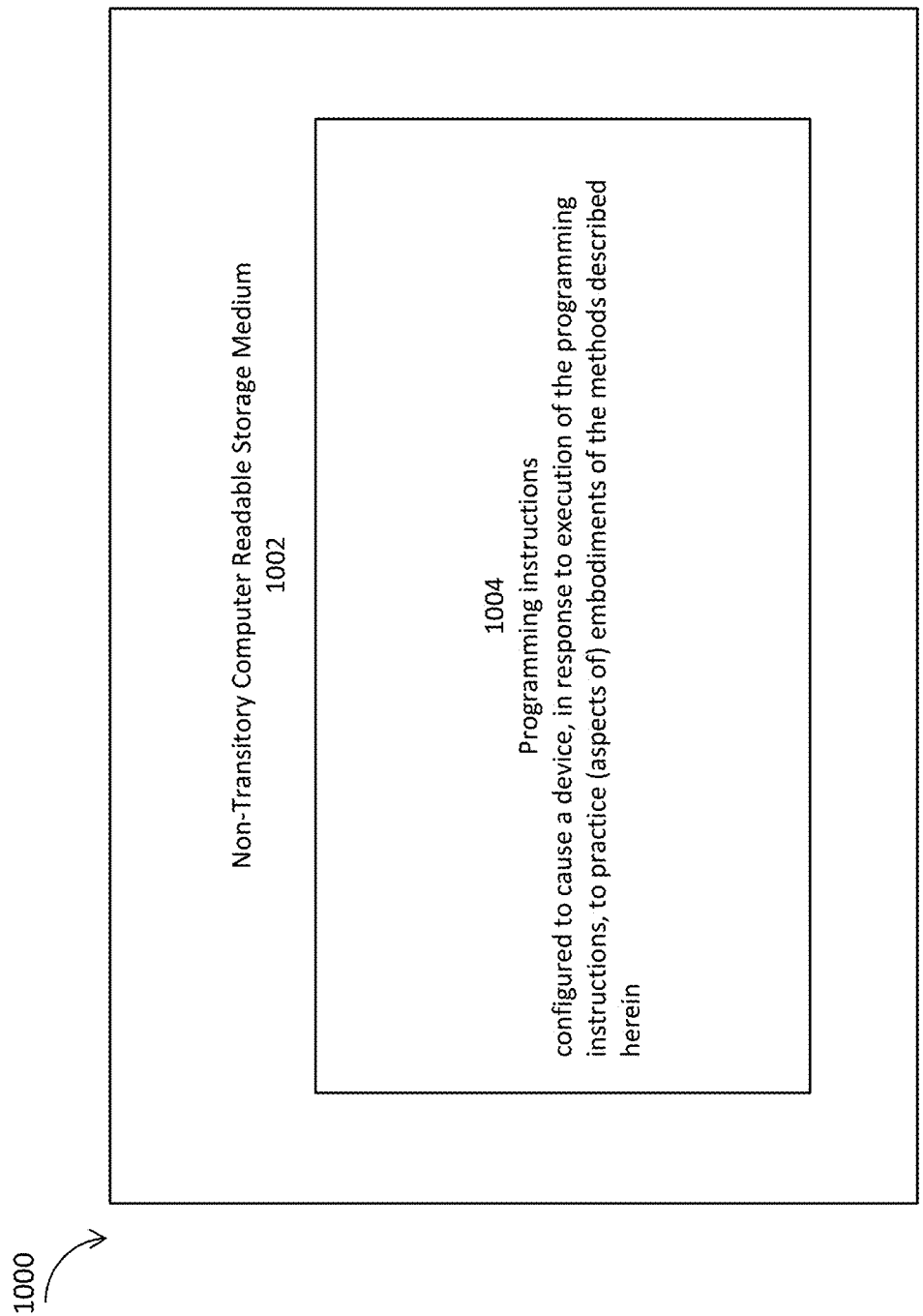
FIG. 10 illustrates a storage medium having instructions for practicing methods described with references to FIGS. 1-9, in accordance with various embodiments.

Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., device 700 or the computing device 101, in response to execution of the programming instructions, to perform, e.g., various operations associated with the connector manager 173 or the BIOS 191 shown in FIG. 1. For example, programming instructions 1004 may be configured to enable the computing device 101, in response to execution of the programming instructions 1004, to perform various operations illustrated in FIG. 3 for the BIOS 191, or various operations illustrated in FIG. 4 for the connector manager 173.

In alternate embodiments, programming instructions 1004 may be disposed on multiple computer-readable non-transitory storage media 1002 instead. In alternate embodiments, programming instructions 1004 may be disposed on computer-readable transitory storage media 1002, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

EXAMPLES

Example 1 may include a computing device, comprising: a connector with a power port and a data port; a connector manager coupled to the connector, wherein the connector manager is to: identify whether a port partner is coupled to the connector; identify an inquiry related to a status of the connector, the inquiry received from a basic input/output system (BIOS) of the computing device; generate, based on the identification of whether the port partner is coupled to the connector and the inquiry, an indication of the status of the connector; and transmit the indication of the status of the connector to the BIOS.

Example 2 may include the computer device of example 1, wherein the connector manager is further to: identify that there is no port partner coupled to the connector; and generate the indication of the status of the connector to indicate that there is no port partner coupled to the connector.

Example 3 may include the computer device of example 1, wherein the connector manager is to: identify that there is a port partner coupled to the connector; identify a capability of the port partner for power delivery through the power port of the connector; establish a connection through the power port of the connector with the port partner based on the capability of the port partner for power delivery through the power port of the connector; and generate the indication of the status of the connector to indicate that the connection through the power port of the connector with the port partner is established.

Example 4 may include the computer device of example 1, wherein the connector manager is to: identify that there is a port partner coupled to the connector; identify a capability of the port partner for data communication through the data port of the connector; configure the data port of the connector based on the capability of the port partner for data communication through the data port of the connector; and generate the indication of the status of the connector to indicate that the data port of the connector is configured.

Example 5 may include the computer device of example 3, wherein to identify the capability of the port partner for power delivery through the power port of the connector is to: start a timer for the connector; and identify the capability of the port partner for power delivery when the connector manager receives, before the timer expires, a response or a command from the port partner coupled to the connector.

Example 6 may include the computer device of example 4, wherein to identify the capability of the port partner for data communication through the data port of the connector is to: start a timer for the connector; and identify the capability of the port partner for data communication when the connector manager receives, before the timer expires, a response or a command from the port partner coupled to the connector.

Example 7 may include the computer device of example 1, wherein the connector manager is to be executed on an embedded processor coupled to the connector, and further coupled to a processor of the computing device, and wherein the BIOS is to be executed on the processor.

Example 8 may include the computer device of example 1, wherein the connector is a first connector, the computing device further includes a second connector with a power port and a data port; the connector manager is coupled to the first connector and the second connector, and wherein the connector manager is further to: identify whether a port partner is coupled to the second connector; identify a second inquiry related to a status of the second connector, the second inquiry received from the BIOS of the computing device; generate, based on the identification of whether the port partner is coupled to the second connector and the second inquiry, a second indication of the status of the second connector; and transmit the second indication to the BIOS.

Example 9 may include the computer device of any one of examples 1-4, wherein the connector is a universal serial bus (USB) Type-C connector, and the data port is a Display Port (DP).

Example 10 may include the computer device of any one of examples 1-4, wherein the port partner is coupled to the data port of the connector, and the port partner is further capable to be coupled to another device.

Example 11 may include the computer device of any one of examples 1-4, wherein the port partner is an adaptor without a power port, a port partner of a docking station with a power port, or a port partner of a docking station without a power port.

Example 12 may include a computing device, comprising: a connector with a power port and a data port; a processor coupled to the connector; and a basic input/output system (BIOS) to be executed by the processor, wherein the BIOS is to: identify that a data device coupled to the connector through a port partner is to be initialized; and transmit to a connector manager an inquiry related to a status of the connector.

Example 13 may include the computer device of example 12, wherein the BIOS is further to: identify an indication of the status of the connector from the connector manager; and initialize, based on the indication of the status of the connector, the data device coupled to the connector through the port partner.

Example 14 may include the computer device of example 13, wherein the BIOS is further to: start a boot process for the computing device before the data device coupled to the connector through the port partner is identified to be initialized; stop the boot process before the inquiry related to the status of the connector is transmitted; and resume the boot process after the indication of the status of the connector from the connector manager is identified.

Example 15 may include the computer device of any one of examples 12-13, wherein the port partner coupled to the connector has a capability for power delivery through the power port of the connector, or a capability for data communication through the data port of the connector.

Example 16 may include the computer device of any one of examples 12-13, wherein the connector is a universal serial bus (USB) Type-C connector, and the data port is a Display Port (DP).

Example 17 may include the computer device of any one of examples 12-13, wherein the computing device provides power through the power port of the connector, or consumes power through the power port of the connector.

Example 18 may include the computer device of any one of examples 12-13, wherein the data device coupled to the connector includes a display, and the data port of the connector is a DP port, a High-Definition Multimedia Interface (HDMI) port, a Digital Visual Interface (DVI) port, or a Video Graphics Array (VGA) port.

Example 19 may include a computing system, comprising: a connector with a power port and a data port; an embedded processor coupled to the connector, wherein the embedded processor is to: identify a port partner is coupled to the connector; establish a connection through the power port of the connector with the port partner when the port partner has a capability for power delivery through the power port of the connector; configure the data port of the connector when the port partner has a capability for data communication through the data port of the connector; identify an inquiry related to a status of the connector, the inquiry received from a basic input/output system (BIOS) of the computing system; generate, based on the identification of the port partner coupled to the connector and the inquiry, an indication of the status of the connector; and transmit the indication of the status of the connector to the BIOS.

Example 20 may include the computer system of example 19, further comprising: a processor coupled to the connector and the embedded processor, wherein the BIOS is to be executed by the processor, and wherein the BIOS is further to: identify that a data device coupled to the connector through the port partner is to be initialized; and transmit to the embedded processor the inquiry related to the status of the connector.

Example 21 may include the computer system of example 20, wherein the BIOS is further to: identify the indication of the status of the connector from the embedded processor; and initialize the data device coupled to the connector through the port partner.

Example 22 may include the computer system of example 21, wherein the BIOS is further to: start a boot process for the computing system before the data device coupled to the connector through the port partner is identified to be initialized; stop the boot process before the inquiry related to the status of the connector is transmitted; and resume the boot process after the indication of the status of the connector from the embedded processor is identified.

Example 23 may include the computer device of any one of examples 19-20, wherein the connector is a universal serial bus (USB) Type-C connector, and the data port is a DisplayPort (DP).

Example 24 may include the computer device of any one of examples 19-20, wherein the computing system provides power through the power port of the connector, or consumes power through the power port of the connector.

Example 25 may include the computer device of any one of examples 19-20, wherein the data device coupled to the connector through the port partner includes a display, and the data port of the connector is a DP port, a High-Definition Multimedia Interface (HDMI) port, a Digital Visual Interface (DVI) port, or a Video Graphics Array (VGA) port.

Example 26 may include an embedded controller (EC) comprising: means to identify that DisplayPort (DP) negotiation for a DP capable port partner is complete; and means to transmit, to a basic input/output system (BIOS) an indication that the DP negotiation is complete.

Example 27 may include the EC of example 26 and/or some other example herein, wherein the EC is a microcontroller.

Example 28 may include the EC of example 26 and/or some other example herein, wherein the EC is a universal serial bus (USB) Type-C Port Manager (TCPM).

Example 29 may include one or more processors to implement a basic input/output system (BIOS), the one or more processors comprising: means to identify that a display initialization routine is to be performed; means to transmit, based on the identification of the display initialization routine and prior to performance of the display initialization routine, a query to a universal serial bus Type-C (USB-C) embedded controller (EC) related to DisplayPort negotiation; means to identify, based on the query, an indication received from the USB-C EC that the DP negotiation is complete; and means to perform, based on the indication, the display initialization routine.

Example 30 may include an embedded controller (EC) comprising: circuitry to identify that DisplayPort (DP) negotiation for a DP capable port partner is complete; and circuitry to transmit, to a basic input/output system (BIOS) an indication that the DP negotiation is complete.

Example 31 may include the EC of example 30 and/or some other example herein, wherein the EC is a microcontroller.

Example 32 may include the EC of example 30 and/or some other example herein, wherein the EC is a universal serial bus (USB) Type-C Port Manager (TCPM).

Example 33 may include one or more processors to implement a basic input/output system (BIOS), the one or more processors to: identify that a display initialization routine is to be performed; transmit, based on the identification of the display initialization routine and prior to performance of the display initialization routine, a query to a universal serial bus Type-C (USB-C) embedded controller (EC) related to DisplayPort negotiation; identify, based on the query, an indication received from the USB-C EC that the DP negotiation is complete; and perform, based on the indication, the display initialization routine.

Example 34 may include one or more non-transitory computer-readable media comprising instructions that, when executed by an embedded controller (EC), cause the EC to: identify that DisplayPort (DP) negotiation for a DP capable port partner is complete; and transmit, to a basic input/output system (BIOS) an indication that the DP negotiation is complete.

Example 35 one or more non-transitory computer-readable media of example 9 and/or some other example herein, wherein the EC is a microcontroller.

Example 36 may include the one or more non-transitory computer-readable media of example 34 and/or some other example herein, wherein the EC is a universal serial bus (USB) Type-C Port Manager (TCPM).

Example 37 may include one or more non-transitory computer-readable media comprising instructions to cause one or more processors implement a basic input/output system (BIOS), upon execution of the instructions by the one or more processors, to: identify that a display initialization routine is to be performed; transmit, based on the identification of the display initialization routine and prior to performance of the display initialization routine, a query to a universal serial bus Type-C (USB-C) embedded controller (EC) related to DisplayPort negotiation; identify, based on the query, an indication received from the USB-C EC that the DP negotiation is complete; and perform, based on the indication, the display initialization routine.

Example 38 may include a method comprising: identifying, by an embedded controller (EC), that DisplayPort (DP) negotiation for a DP capable port partner is complete; and transmitting, by the EC to a basic input/output system (BIOS), an indication that the DP negotiation is complete.

Example 39 may include the method of example 38 and/or some other example herein, wherein the EC is a microcontroller.

Example 40 may include the method of example 38 and/or some other example herein, wherein the EC is a universal serial bus (USB) Type-C Port Manager (TCPM).

Example 41 may include a method comprising: identifying, by a basic input/output system (BIOS), that a display initialization routine is to be performed; transmitting, by the BIOS based on the identification of the display initialization routine and prior to performance of the display initialization routine, a query to a universal serial bus Type-C (USB-C) embedded controller (EC) related to DisplayPort negotiation; identifying, by the BIOS based on the query, an indication received from the USB-C EC that the DP negotiation is complete; and performing, by the BIOS based on the indication, the display initialization routine.

Example 42 may include an apparatus comprising means to perform one or more elements of a method described in or related to any of examples 1-41, or any other method or process described herein.

Example 43 may include one or more non-transitory computer-readable media comprising instructions to cause an electronic device, upon execution of the instructions by one or more processors of the electronic device, to perform one or more elements of a method described in or related to any of examples 1-41, or any other method or process described herein.

Example 44 may include an apparatus comprising logic, modules, and/or circuitry to perform one or more elements of a method described in or related to any of examples 1-41, or any other method or process described herein.

Example 45 may include a method, technique, or process as described in or related to any of examples 1-41, or portions or parts thereof.

Example 46 may include an apparatus comprising: one or more processors and one or more computer readable media comprising instructions that, when executed by the one or more processors, cause the one or more processors to perform the method, techniques, or process as described in or related to any of examples 1-41, or portions thereof.

Example 47 may include a method of communicating in a wireless network as shown and described herein.

Example 48 may include a system for providing wireless communication as shown and described herein.

Example 49 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for managing a connector on a computing device having a basic input/output system (BIOS), the connector having a power port and a data port, and the apparatus comprising:
    a connector manager coupled to the connector and the BIOS, wherein the connector manager is to:
        identify whether a port partner is coupled to the connector;
        identify an inquiry related to a status of the connector, the inquiry received from the basic input/output system (BIOS) of the computing device;
        generate, based on the identification of whether the port partner is coupled to the connector and the inquiry from the BIOS, an indication of the status of the connector; and
        transmit the indication of the status of the connector to the BIOS;
    wherein the connector manager is further to: identify that there is no port partner coupled to the connector; and generate the indication of the status of the connector to indicate that there is no port partner coupled to the connector.

2. The apparatus of claim 1, wherein the connector manager is to:
    identify that there is a port partner coupled to the connector;
    identify a capability of the port partner for power delivery through the power port of the connector;
    establish a connection through the power port of the connector with the port partner based on the capability of the port partner for power delivery through the power port of the connector; and
    generate the indication of the status of the connector to indicate that the connection through the power port of the connector with the port partner is established.

3. The apparatus of claim 1, wherein the connector manager is to:
    identify that there is a port partner coupled to the connector;
    identify a capability of the port partner for data communication through the data port of the connector;
    configure the data port of the connector based on the capability of the port partner for data communication through the data port of the connector; and
    generate the indication of the status of the connector to indicate that the data port of the connector is configured.

4. The apparatus of claim 2, wherein to identify the capability of the port partner for power delivery through the power port of the connector is to:
    start a timer for the connector; and
    identify the capability of the port partner for power delivery when the connector manager receives, before the timer expires, a response or a command from the port partner coupled to the connector.

5. The apparatus of claim 3, wherein to identify the capability of the port partner for data communication through the data port of the connector is to:
    start a timer for the connector; and
    identify the capability of the port partner for data communication when the connector manager receives, before the timer expires, a response or a command from the port partner coupled to the connector.

6. The apparatus of claim 1, wherein the connector manager is to be executed on an embedded processor coupled to the connector, and further coupled to a processor of the computing device, and wherein the BIOS is to be executed on the processor.

7. The apparatus of claim 1, wherein the connector is a first connector, the computing device further includes a second connector with a power port and a data port; the connector manager is coupled to the first connector and the second connector, and wherein the connector manager is further to:
    identify whether a port partner is coupled to the second connector;
    identify a second inquiry related to a status of the second connector, the second inquiry received from the BIOS of the computing device;
    generate, based on the identification of whether the port partner is coupled to the second connector and the second inquiry, a second indication of the status of the second connector; and
    transmit the second indication to the BIOS.

8. The apparatus of claim 1, wherein the connector is a universal serial bus (USB) Type-C connector, and the data port is a Display Port (DP).

9. The apparatus of claim 1, wherein the port partner is coupled to the data port of the connector, and the port partner is further capable to be coupled to another device.

10. The apparatus of claim 1, wherein the port partner is an adaptor without a power port, a port partner of a docking station with a power port, or a port partner of a docking station without a power port.

11. A computing device, comprising:
a connector with a power port and a data port;
a processor coupled to the connector; and
a basic input/output system (BIOS) to be executed by the processor, wherein the BIOS is to:
identify that a data device coupled to the connector through a port partner is to be initialized; and
transmit to a connector manager of the computing device, separate and distinct from the BIOS, an inquiry related to a status of the connector;
wherein the BIOS waits to perform the initialization of the data device through the port partner until the connector manager has configured the power port or the data port of the connector;
wherein the BIOS is further to: identify an indication of the status of the connector from the connector manager, and initialize, based on the indication of the status of the connector, the data device coupled to the connector through the port partner.

12. The computing device of claim 11, wherein the BIOS is further to:
start a boot process for the computing device before the data device coupled to the connector through the port partner is identified to be initialized;
stop the boot process before the inquiry related to the status of the connector is transmitted; and
resume the boot process after the indication of the status of the connector from the connector manager is identified.

13. The computing device of claim 11, wherein the port partner coupled to the connector has a capability for power delivery through the power port of the connector, or a capability for data communication through the data port of the connector.

14. The computing device of claim 11, wherein the connector is a universal serial bus (USB) Type-C connector, and the data port is a Display Port (DP).

15. The computing device of claim 11, wherein the computing device provides power through the power port of the connector, or consumes power through the power port of the connector.

16. The computing device of claim 11, wherein the data device coupled to the connector includes a display, and the data port of the connector is a DP port, a High-Definition Multimedia Interface (HDMI) port, a Digital Visual Interface (DVI) port, or a Video Graphics Array (VGA) port.

17. A computing system, comprising:
a central processor to operate a basic input/output system (BIOS);
a connector with a power port and a data port;
an embedded processor coupled to the connector, wherein the embedded processor is to operate a connector manager to:
identify a port partner is coupled to the connector;
establish a connection through the power port of the connector with the port partner when the port partner has a capability for power delivery through the power port of the connector;
configure the data port of the connector when the port partner has a capability for data communication through the data port of the connector;
identify an inquiry related to a status of the connector, the inquiry received from the basic input/output system (BIOS) of the computing system;
generate, based on the identification of the port partner coupled to the connector and the inquiry, an indication of the status of the connector; and
transmit the indication of the status of the connector to the BIOS;
wherein the computing system further comprises the BIOS, and wherein the BIOS is further to identify that a data device coupled to the connector through the port partner is to be initialized; and transmit to the embedded processor the inquiry related to the status of the connector.

18. The computing system of claim 17, wherein the BIOS is further to:
identify the indication of the status of the connector from the embedded processor; and
initialize the data device coupled to the connector through the port partner.

19. The computing system of claim 18, wherein the BIOS is further to:
start a boot process for the computing system before the data device coupled to the connector through the port partner is identified to be initialized;
stop the boot process before the inquiry related to the status of the connector is transmitted; and
resume the boot process after the indication of the status of the connector from the embedded processor is identified.

20. The computing system of claim 17, wherein the connector is a universal serial bus (USB) Type-C connector, and the data port is a DisplayPort (DP).

21. The computing system of claim 17, wherein the computing system provides power through the power port of the connector, or consumes power through the power port of the connector.

22. The computing system of claim 17, wherein the data device coupled to the connector through the port partner includes a display, and the data port of the connector is a DP port, a High-Definition Multimedia Interface (HDMI) port, a Digital Visual Interface (DVI) port, or a Video Graphics Array (VGA) port.

* * * * *